(12) United States Patent
Piorkowski et al.

(10) Patent No.: US 7,032,863 B1
(45) Date of Patent: Apr. 25, 2006

(54) INCREASED SECURITY FLIGHT DECK DOOR STRIKE APPARATUS AND METHOD

(75) Inventors: Mitchell J. Piorkowski, Mill Creek, WA (US); Jann F. Garrett, Everett, WA (US); Douglas E. Emsley, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/966,264

(22) Filed: Oct. 15, 2004

(51) Int. Cl.
*B64C 1/14* (2006.01)

(52) U.S. Cl. .................... 244/129.4; 292/340

(58) Field of Classification Search ............. 244/118.5, 244/119, 121, 129.1, 129.4, 129.5, 131; 292/340, 292/341.15, 341.16, 201
See application file for complete search history.

(56) References Cited

U.S. PATENT DOCUMENTS

| | | | | |
|---|---|---|---|---|
| 3,099,205 A | * | 7/1963 | Lovrinch | 100/255 |
| 4,169,616 A | * | 10/1979 | Peterson | 292/144 |
| 4,522,359 A | * | 6/1985 | Church et al. | 244/129.5 |
| 4,681,286 A | * | 7/1987 | Church et al. | 244/129.5 |
| 5,421,178 A | * | 6/1995 | Hamel et al. | 70/283 |
| 5,879,036 A | * | 3/1999 | Moline et al. | 292/210 |
| 6,595,564 B1 | * | 7/2003 | Hanchett et al. | 292/341.16 |
| 6,866,226 B1 | * | 3/2005 | Pratt et al. | 244/129.4 |
| 6,866,227 B1 | * | 3/2005 | Pratt et al. | 244/129.4 |
| 6,871,821 B1 | * | 3/2005 | Takahama | 244/129.5 |
| 6,886,305 B1 | * | 5/2005 | Ward | 52/745.15 |
| 6,886,869 B1 | * | 5/2005 | Martinez et al. | 292/216 |
| 6,902,137 B1 | * | 6/2005 | Brzeski et al. | 244/129.5 |
| 2003/0052227 A1 | * | 3/2003 | Pittman | 244/118.5 |
| 2003/0122387 A1 | * | 7/2003 | Ward | 292/341.16 |
| 2003/0132345 A1 | * | 7/2003 | Lehmann | 244/118.5 |
| 2003/0173458 A1 | * | 9/2003 | Bandy et al. | 244/118.5 |
| 2003/0222175 A1 | * | 12/2003 | Movsesian et al. | 244/118.5 |
| 2004/0032130 A1 | * | 2/2004 | Oxley | 292/201 |
| 2004/0046084 A1 | * | 3/2004 | Brzeski et al. | 244/129.5 |
| 2004/0094670 A1 | * | 5/2004 | Pratt et al. | 244/129.4 |
| 2004/0195456 A1 | * | 10/2004 | Sekikawa et al. | 244/129.5 |
| 2005/0082433 A1 | * | 4/2005 | Saku et al. | 244/129.5 |
| 2005/0116100 A1 | * | 6/2005 | Pratt et al. | 244/118.5 |

* cited by examiner

*Primary Examiner*—Teri Pham Luu
*Assistant Examiner*—S. A. Holzen
(74) *Attorney, Agent, or Firm*—Harness Dickey & Pierce P.L.C.

(57) ABSTRACT

A door strike apparatus for enabling opening of a door in the event of a decompression condition experienced within a flight deck area includes a housing supported adjacent the door and a strike arm movable between a locked state restricting rotation of the door and an unlocked state permitting rotation of the door. A solenoid having a lock member retracted from the strike arm when the strike arm is in the unlocked state and engaged with the strike arm when the strike arm is in the locked state. The solenoid is responsive to the decompression condition and selectively toggles the lock member out of engagement with the strike arm to permit automatic unlocking of the strike arm and opening of the door under the decompression condition and into engagement with the strike arm to permit selective locking of the door when the decompression condition is absent.

21 Claims, 9 Drawing Sheets

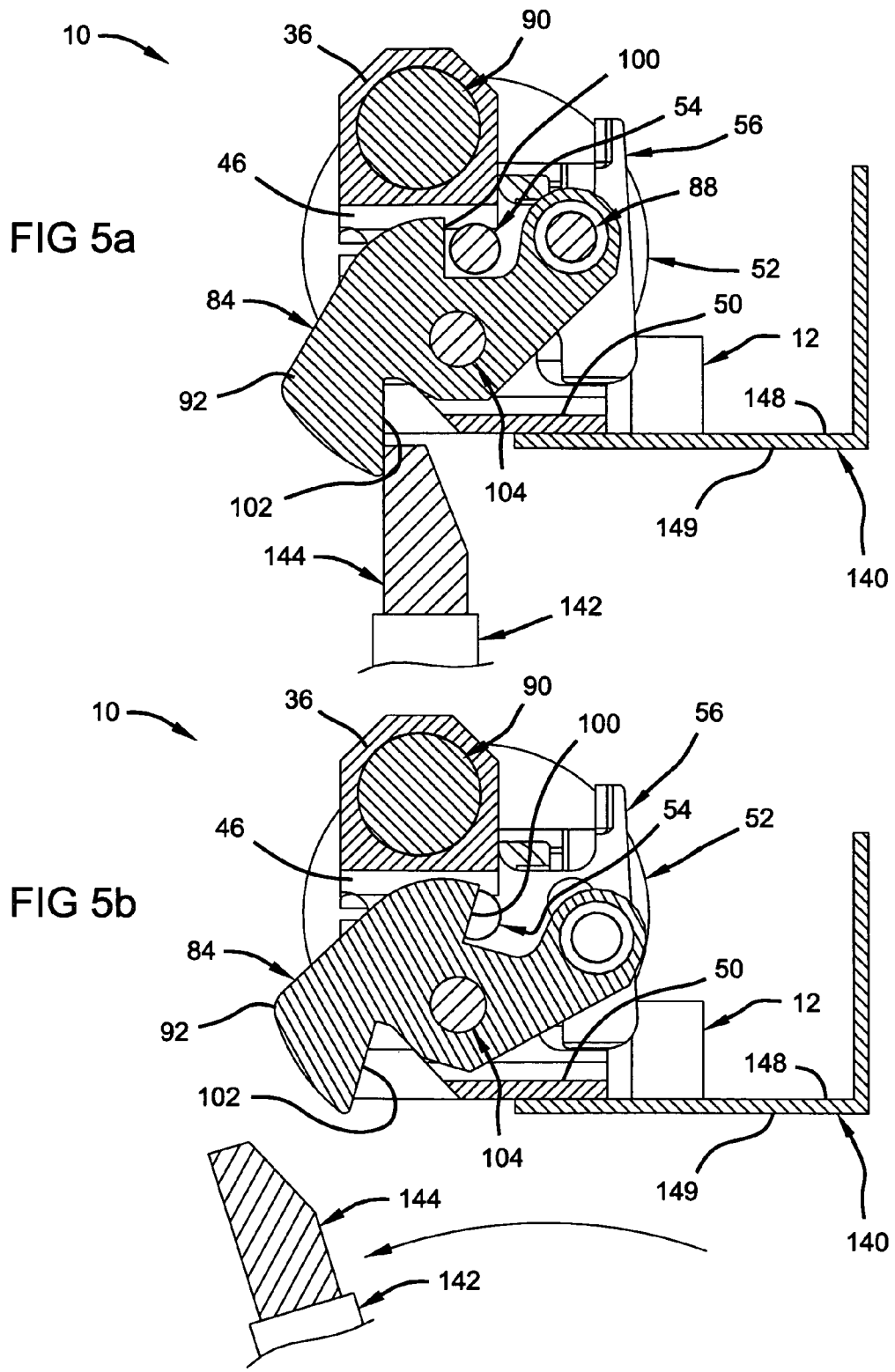

INCREASED SECURITY FLIGHT DECK DOOR STRIKE APPARATUS AND METHOD

FIELD OF INVENTION

The present invention relates generally to door strike assemblies and more particularly to an improved door strike assembly for a door of a mobile platform.

BACKGROUND OF THE INVENTION

The United States Government, in response to recent terrorist attacks in the United States and across the world, has implemented various regulations designed to thwart terrorists from commandeering mobile platforms such as aircrafts, busses, and subways. For example, the United States Government now requires aircrafts to include secure cockpit doors that are resistant to terrorist intrusion in an effort to prevent terrorists and otherwise unauthorized personnel from gaining access to the cockpits and controls of aircrafts.

Manufacturers now provide mobile platforms with cockpit doors that incorporate enhanced safety features to even better prevent unauthorized entry onto a flight deck or otherwise restricted area, and to comply with governmental regulations. Many manufacturers have incorporated safety features such as cockpit door frame reinforcements, bulletproof materials, and improved cockpit door latches. Such improvements typically act in concert to provide a security system that prevents intruders from gaining access to restricted areas of the platform. Generally speaking, enhancements to the construction of the door, door frame, and latch have operated to further help prevent breaching a locked cockpit door, and thus, gaining unauthorized access to a restricted area of the mobile platform.

For mobile platforms such as busses and subway trains, cockpit door reinforcements and door latch systems adequately prevent intrusion into the cockpit of the respective platform. Increases in the strength of the materials used in construction of the cockpit door and door frame, in conjunction with a stronger latching system, are often able to withstand forces applied to an outside surface of the door and thus prevent most intruders from gaining access to a restricted area of the platform.

Cockpit door reinforcements such as enhanced cockpit doors and door frames made from stronger materials can similarly be used in protection of a cockpit of an aircraft. Such reinforcements typically restrict entry to the cockpit and therefore adequately prevent cockpit intrusion. However, while such cockpit door and door frame improvements adequately prevent access to restricted areas, conventional reinforced door latch mechanisms are not suitable for use with an aircraft due to the pressurization of aircraft cabins and cockpits.

Aircraft cabins, and thus cockpits, are pressurized due to the altitude at which most commercial aircraft fly. The cabin and cockpit pressure is maintained at a certain pressure to provide passengers and crew of the aircraft with a safe and pleasant flight. However, under certain situations, the cabin and cockpit may lose pressure and experience a "decompression" event. Forces associated with such decompression events are typically large and occur very rapidly, thereby causing the cabin and cockpit to experience structural changes.

Aircraft are required to fly with the cockpit door securely locked to prevent intrusion into the cockpit, as previously discussed. Under a cockpit decompression event, however, the cockpit door must be opened to allow venting of the cabin area and relieve the pressure on the cockpit/cabin bulkhead therein. However, due to the size and rate of the forces exerted on the cockpit door and its associated frame/support structure during a decompression event, conventional latches could jam and therefore essentially prevent the cockpit door from being opened. Such jamming experienced during a decompression event is typically not an issue for a conventional cockpit door as conventional doors are not typically equipped with a door latch and strike capable of locking the door. However, due to recent FAA regulations, door latch and door strike systems are required to maintain the cockpit door in a locked position for the duration of a flight.

Therefore, a cockpit door latch and door strike system that adequately locks a cockpit door to prevent intrusion into the cockpit during flight while still allowing for opening of the cockpit door during a decompression event, is needed.

SUMMARY OF THE INVENTION

The present invention is directed to a door strike apparatus for enabling opening of a door in the event of a decompression condition experienced in a vicinity of the door. The apparatus includes a housing supported on a frame adjacent to the door and a strike arm rotatably supported by the housing and movable between a locked state restricting rotation of the door and an unlocked state permitting rotation of the door. The door strike apparatus further includes a lock pin movable between a locked state and an unlocked state, wherein the lock pin is retracted from the strike arm when the strike arm is in the unlocked state and is engaged with the strike arm when the strike arm is in the locked state.

A solenoid includes an output fixedly attached to the lock pin and movable between an extended position and a retracted position. The solenoid selectively toggles the lock pin into and out of engagement with the strike arm to selectively toggle the strike arm between the locked state and the unlocked state. The solenoid, by electronic/electrical logic, is automatically de-energized under a cockpit decompression event and retracts the lock pin from engagement with the strike arm, thus permitting rotation of the door. Specifically, when a change/drop in pressure is realized within the cockpit of the aircraft, the solenoid is automatically de-energized and the strike arm is toggled into the unlocked state (by lock pin retraction), thereby permitting rotation of the door. Under normal conditions, the solenoid is selectively energized and de-energized by a user to lock and unlock the door to selectively permit entry of authorized personnel into the cockpit at the discretion of the flight crew.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 5a is a cross-sectional view of the strike assembly of FIG. 1 in a locked state taken along line V—V;

FIG. 5b is a cross-sectional view of the strike assembly of FIG. 1 in an unlocked state taken along line V—V;

DETAILED DESCRIPTION OF THE PREFERRED EMBODIMENTS

The following description of the preferred embodiment(s) is merely exemplary in nature and is in no way intended to limit the invention, its application, or uses.

Figure 1:
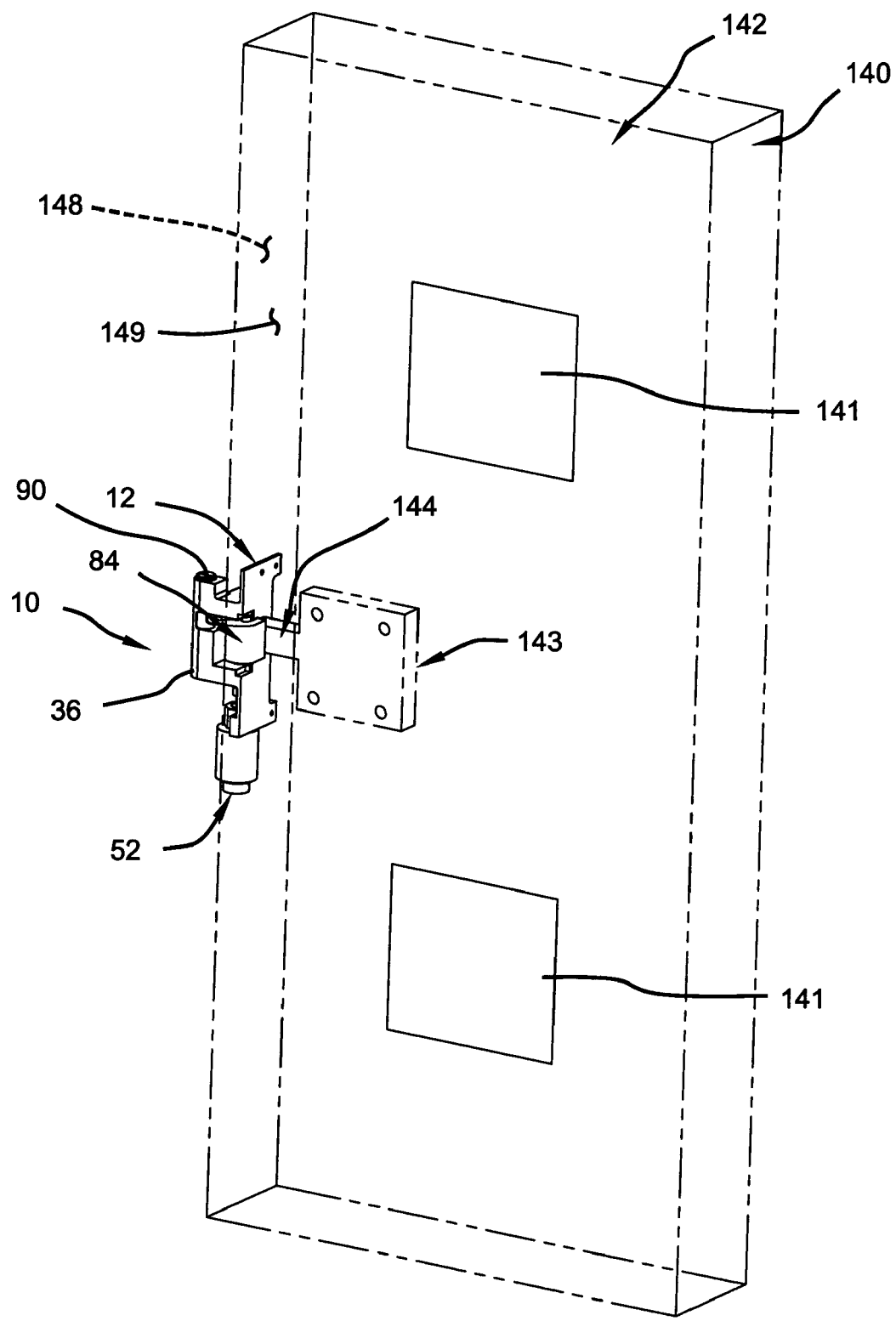
FIG. 1 is a perspective view of a door and door frame incorporating a strike assembly in accordance with a preferred embodiment of the present invention.
Figure 2:
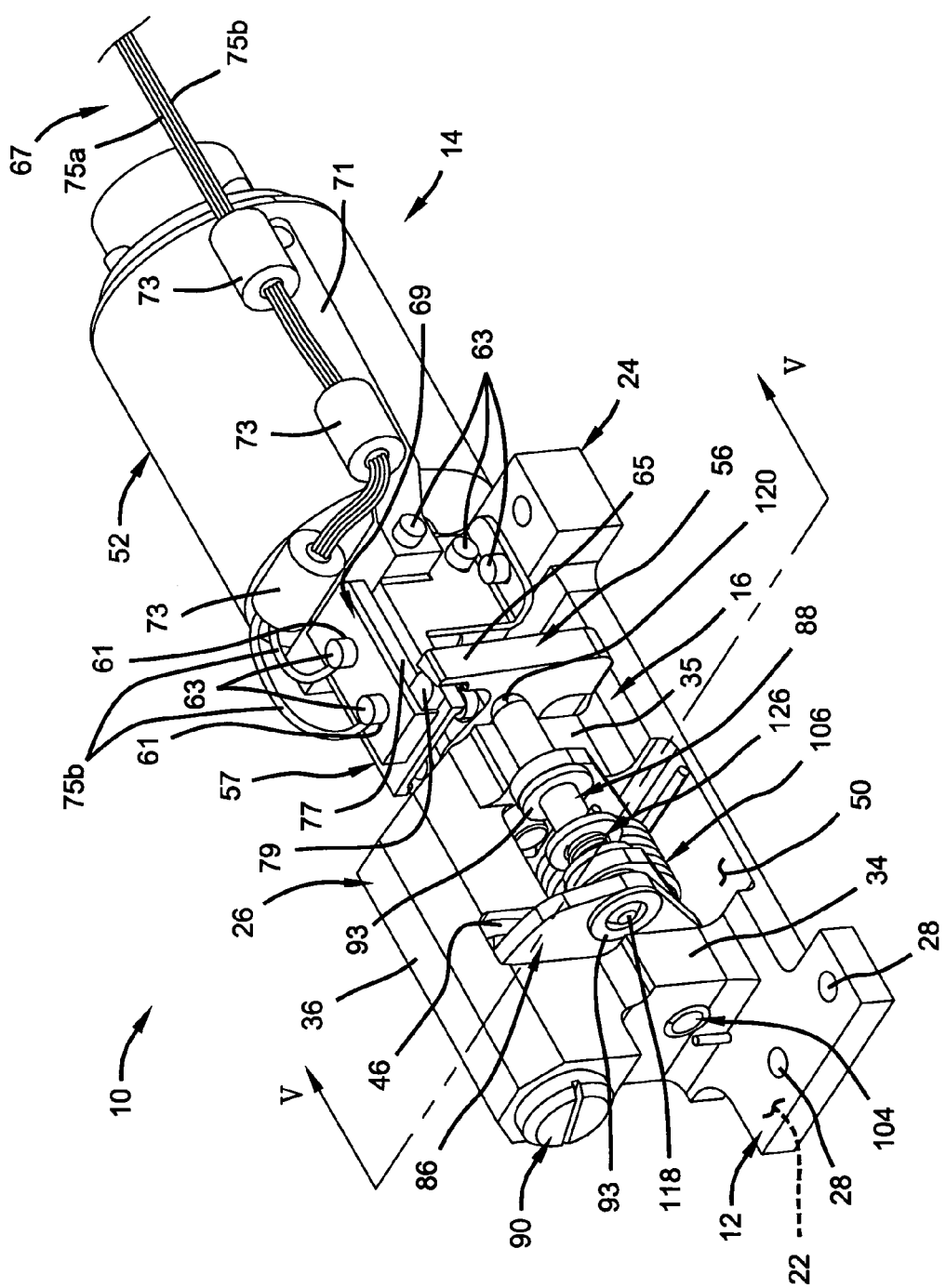
FIG. 2 is a perspective view of the strike assembly of FIG. 1.

With reference to FIGS. 1 and 2, a door strike assembly 10 in accordance with a preferred embodiment of the present invention is illustrated. The door strike assembly 10 includes a housing 12, an actuation mechanism 14, and a lock mechanism 16. The actuation mechanism 14 is operably supported by the housing 12 and selectively engages the lock mechanism 16 to toggle the lock mechanism 16 between a locked state and an unlocked state.

Figure 3:
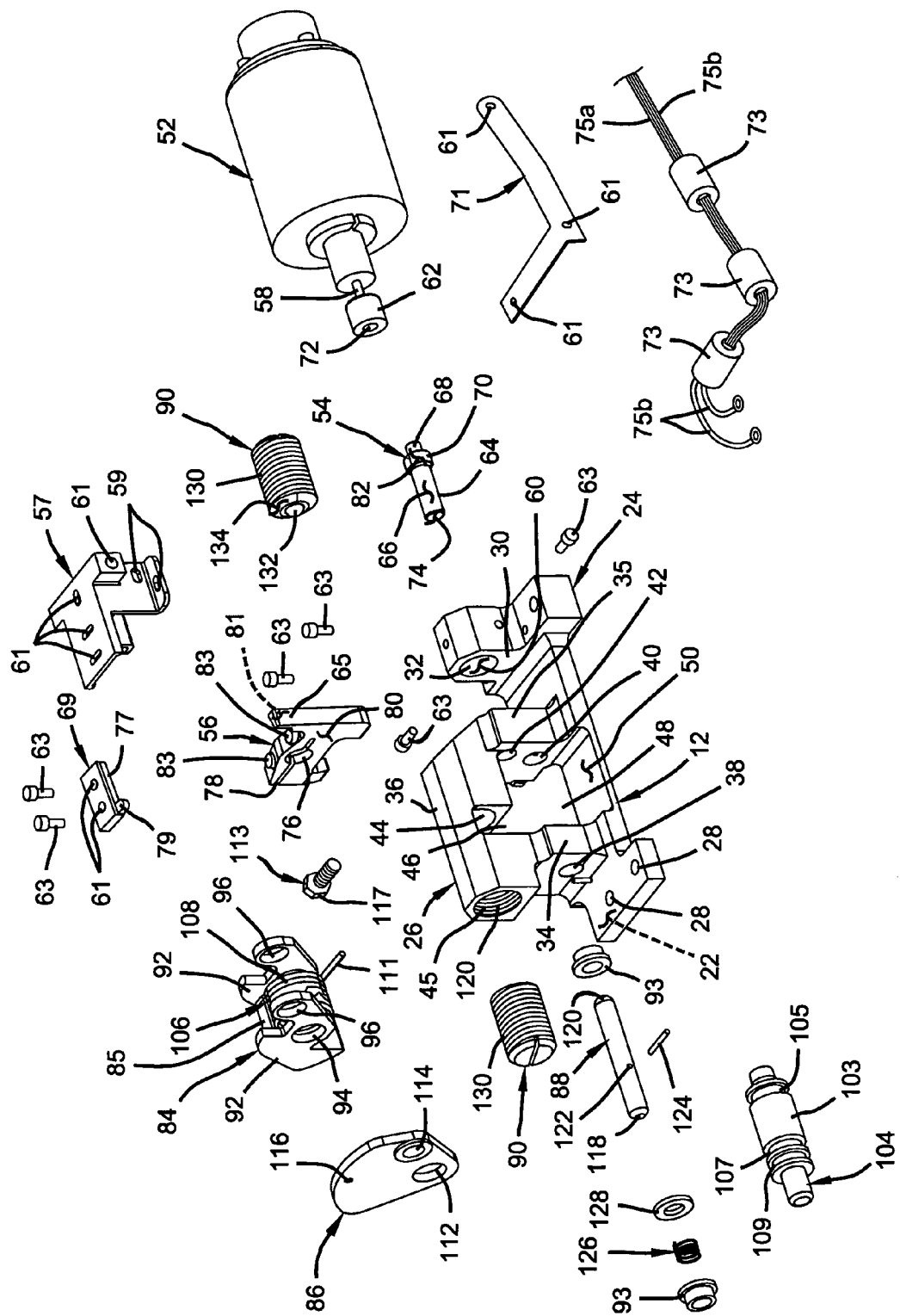
FIG. 3 is an exploded view of the strike assembly of FIG. 1.

Referring specifically to FIGS. 2 and 3, the housing 12 includes a generally planar surface 22, an actuation housing 24, and a lock housing 26. The planar surface 22 extends generally along the length of the housing 12 and includes a plurality of attachment apertures 28 for mounting the strike assembly 10 to supporting structure. The actuation housing 24 supports the actuation mechanism 14 and includes a shoulder 30 having an aperture 32 extending therethrough. The lock housing 26 is disposed adjacent to the actuation housing 24 and supports the lock mechanism 16.

The lock housing 26 includes a pair of support posts 34, 35 and a cross-member 36 extending between the support posts 34, 35. The supports posts 34, 35 fixedly attach the cross-member 36 and serve to rotatably support the lock mechanism 16, as will be described further below. Support post 34 includes an attachment aperture 38 extending therethrough while support post 35 includes an attachment aperture 40 and clearance aperture 42 (FIG. 3).

With specific reference to FIG. 3, the cross-member 36 includes a bore 44 extending along its length and a recess 46. The bore 44 includes a series of threads 45 while the recess 46 is disposed in a channel 48 formed generally between the support posts 34, 35, the cross-member 36, and a bottom surface 50 of the housing 12.

The actuation mechanism 14 includes a solenoid 52, a lock pin 54, and an anti-rotation retainer plate 56. The solenoid 52 includes an output shaft 58 movable between an extended position and a retracted position and a damper (not shown) disposed within the solenoid 52 to ensure quiet operation of the output shaft 58 between the extended and retracted positions. The output shaft 58 is matingly received by aperture 32 of the housing 12 such that as the solenoid 52 causes the output shaft 58 to move between the extended and retracted positions, the shaft 58 translates within aperture 32 of the housing 12.

The lock pin 54 is fixedly attached to the output shaft 58 at the hub 62, and includes a generally cylindrical body 64 having an engagement surface 66, an attachment post 68, and an annular shoulder 70. The attachment post 68 is fixedly received by a bore 72 of hub 62 such that the attachment post 68 is fixed for movement with the hub 62. In this manner, as the solenoid 52 translates the output shaft 58 and hub 62 between the extended and retracted positions, the lock pin 54 is similarly translated relative to the housing 12. The cylindrical body 64 is slidably received by clearance aperture 42 of support post 35 such that as the solenoid 52 extends and retracts the hub 62, the lock pin 54 is concurrently translated within clearance aperture 42 relative to the housing 12. The cylindrical body 64 also includes a tapered end surface 74 that facilitates insertion of the lock pin 54 into clearance aperture 42 and improves performance of the lock mechanism 16, as will be described further below.

With continuing reference to FIG. 3, the anti-rotation retainer plate 56 includes an aperture 76 and a slot 78. The slot 78 extends into the aperture 76 and beyond such that access to the aperture 76 is provided to allow the retainer plate 56 to matingly engage the lock pin 54 and output shaft 58 to thereby prevent rotation of the lock pin 54 relative to the hub 62. The anti-rotation retainer plate 56 is disposed generally around the lock pin 54 and the hub 62 such that the annular shoulder 70 of the lock pin 54 extends into and through aperture 76. In this manner, the retainer plate 56 is essentially attached to the output shaft 58 through engagement between aperture 76 of the retainer plate 56 and an outer surface 82 of the lock pin 54. Once shoulder 70 is received by aperture 76, a pair of fasteners 83 essentially clamp the retainer plate 56 to the lock pin 54 about surface 82 such that translation of the lock pin 54 causes concurrent translation of the retainer plate 56. Therefore, as the output shaft 58 translates between the extended position and the retracted position, the retainer plate 56 translates therewith.

In addition, a bracket 57 is provided and includes a first series of attachment apertures 59 for fixedly attaching the bracket 57 to the housing 24 and a second series of apertures 61 for attachment of a wiring harness assembly 67. The bracket 57 is mounted to actuation housing 24 with four fasteners 63 received through apertures 59. Similarly, the wiring harness assembly 67 is mounted to the bracket 57 using fasteners 63 such that the bracket 57 fixedly supports the wiring harness assembly 67.

The wiring harness assembly 67 includes an electrical position feedback switch 69, a mounting plate 71, a series of insulated loop clamps 73, and two sets of wires 75a, 75b. The mounting plate 71 fixedly attaches the wiring harness assembly 67 to the housing 12 and bracket 57 and includes a plurality of apertures 59, 61 that correspond to apertures 59, 60 of the housing 12 and bracket 57. The first set of wires 75a power the solenoid 52 while the other set of wires 75b are electrically connected to the feedback/position switch 69 and to an aircraft logic controller (not shown).

The feedback position switch 69 includes a metallic extending arm 77 with a rounded protruding nub 79 at one end. The nub 79 slidably interfaces with an engagement surface 81 of the retainer plate 56 when the solenoid 52 toggles shaft 58 into the extended position. Specifically, when the shaft 58 is extended, the retainer plate 56 is similarly extended such that engagement surface 81 travels along the metallic extending arm 77. Once the retainer plate 56 has sufficiently traveled along the extending arm 77, the engagement surface 81 contacts the nub 79, thereby closing a circuit within the switch 69. When the circuit is closed, a logic signal is sent to the aircraft logic controller to indicate that the mechanism 10 is in the locked condition.

The lock mechanism 16 includes a strike arm 84, a clutch plate 86, a clutch pin 88, and a pair of ball plungers 90. The strike arm 84 includes a pair of attachment arms 92, each having an attachment aperture 94 and a clutch aperture 96. In addition, the strike arm 84 includes a notch 100 and an engagement surface 102 extending generally between the attachment arms 92 and is rotatably supported by the attachment posts 34, 35 of the housing 12. Specifically, a pin 104 having a cylindrical section 103 and first, second, and third retainer bushings 105, 107, 109 is inserted into the attachment apertures 94 of the strike arm 84 and through the attachment apertures 38, 40 of the support posts 34, 35, respectively. In this manner, the strike arm 84 is rotatably supported relative to the housing 12 by the first and second bushings 105, 107 of pin 104.

The strike arm 84 is biased by a coil spring 106 having a generally coiled body 108 and outwardly extending arms 110, 111. The coiled body 108 receives the cylindrical section 103 of pin 104 such that the pin 104 is generally free to rotation relative to the spring 106. Spring arm 110 is fixedly attached to a cross member 85 disposed generally between arms 92 of the strike arm 84 while spring arm 111 engages the bottom surface 50 of the housing 12. In this manner, the coil spring 106 biases the strike arm 84 in the counter-clockwise direction relative the view shown in FIGS. 5a and 5b.

Positional adjustment of the strike arm 84 in the clockwise and counterclockwise direction relative to the view shown in FIGS. 5a and 5b is governed by interaction between a hex head screw 113 and an arm 115 of the strike arm 84. The hex head screw 113 is threadably received by the housing 12 and may be adjusted relative to the housing 12 through rotation of the screw 113.

Movement of the strike arm 84 in the clockwise/counterclockwise direction is controlled to ensure that the engagement surface 102 of the strike arm 84 is substantially perpendicular to surface 22 of the housing 12 when the strike arm 84 is fully rotated in the counterclockwise direction. Adjustments to the rotational limits of the strike arm 84 in the clockwise and counterclockwise direction from a nominal design position provides an adjustment that ensures that the engagement surface 102 of the strike arm 84 is substantially perpendicular to the housing 12.

With reference to FIGS. 3 and 4a–4c, the clutch plate 86 is rotatably supported by the housing 12 adjacent to the strike arm 84 and includes an attachment aperture 112, a lock aperture 114, and a detent 116. The attachment aperture 112 rotatably receives the third retainer bushing 109 of pin 104 such that the clutch plate 86 is permitted to rotate about pin 104 relative to the housing 12. The lock aperture 114 is disposed generally adjacent to the attachment aperture 112 for selective engagement with the clutch pin 88, as will be discussed further below. The detent 116 is formed generally opposite the attachment and lock apertures 112, 114 and generally within the recess 46 of the housing 12 for selective engagement with the ball plungers 90.

The clutch pin 88 is slidably supported by the lock apertures 96 of the strike arm 84 and includes a tapered end 118, a ball end 120, and a post aperture 122. The tapered end 118 facilitates insertion of the clutch pin 88 for selective engagement with the lock aperture 114 of the clutch plate 86. The ball end 120 is disposed at an opposite end of the clutch pin 88 from the tapered end 118 and is matingly received by an engagement surface 80 of the retainer plate 56. The post aperture 122 fixedly receives a spring post 124 to position a washer 128 and coil spring 126 along the clutch pin 88. The spring post 124 fixes the coil spring 126 between the washer 128 and an attachment arm 92 of the striker arm 84 such that the clutch pin 88 is biased generally out of engagement with the lock aperture 114 of the clutch plate 86 and towards the solenoid 52. In addition, a pair of bushings 93 are provided and are received by the lock apertures 96 of the strike arm 84 to facilitate translation of the clutch pin 88 relative to the strike arm 84.

With continued reference to FIG. 3, the ball plungers 90 are threadably received by the threaded bores 44, 45 of the housing 12 and include a series of external threads 130 and a biased ball 132 extending into the recess 46 of the cross-member 36. The external threads 130 are matingly received by the threaded bores 44, 45 such that rotation of the ball plungers 90 causes axial movement of the plungers 90 relative to the cross-member 36. Therefore, the position of the balls 132 within the recess 46 can be adjusted through rotation of the plungers 90 relative to the housing 12. The balls 132 are biased by an encapsulated spring arrangement (not shown) disposed within each plunger 90. The spring arrangement applies a force to the ball 132 that causes the ball 132 to protrude from an end surface 134 of the plunger 90 while concurrently allowing the ball 132 to retreat from surface 134 and into a body of the plunger 90 if a predetermined force is applied.

With reference to FIGS. 5a–7, the strike assembly 10 is shown incorporated into a mobile platform 136. The mobile platform 136 includes a partition 138, a door frame 140, and a door 142. The partition 138 is fixedly attached to the mobile platform 136 and fixedly supports the door frame 140. The door 142 is rotatably supported by the door frame 140 and includes a pair of vent panels 141, a door latch 143, and a door bolt 144 extending therefrom for selective engagement with the strike assembly 10 disposed generally within the door frame 140.

With particular reference to FIGS. 5a and 5b, the strike assembly 10 is fixedly attached to the door frame 140 such that the planar surface 22 of the strike assembly 10 abuts a generally planar inner surface 148 of the door frame 140. The strike assembly 10 is positioned such that the strike arm 84 protrudes from a generally planar outer surface 149 of the door frame 140 and generally interfaces with the latch bolt 144 when the strike assembly 10 is in a locked state. In this position, the latch bolt 144 contacts the engagement surface 102 of the strike arm 84 and prevents rotation of the door 142 relative to the door frame 140.

The strike assembly 10 is in the locked state when the solenoid 52 is energized and in the extended position such that the lock pin 54 is seated within the notch 100 of the strike arm 84, thereby preventing rotation of the strike arm 84 relative to the housing 12. The strike arm 84 rotates relative to the housing 12 about pin 104, as previously discussed. However, when the lock pin 54 is seated within notch 100, rotation of the strike arm 84 relative to the housing 12 is prohibited.

In addition to the engagement between the lock pin 54 and notch 100, the strike arm 84 is further held in the locked state through engagement between the clutch pin 88 and the clutch plate 86. When the solenoid 52 is in the extended position, the clutch pin 88 is received by lock aperture 114 of the clutch plate 86 due to the interaction between the ball end 120 of the clutch pin 88 and engagement surface 80 of the anti-rotation retainer plate 56. Specifically, because the retainer plate 56 is fixed to the output shaft 58 of the solenoid 52, when the solenoid 52 is moved into the extended position, the clutch pin 88 is moved concurrently therewith against the bias of coil spring 126 and engages lock aperture 114 of the clutch plate 86.

At this point, the clutch pin 88 engages both lock apertures 96 of the strike arm 84 as well as lock aperture 114 of the clutch plate 86. As previously discussed, the clutch plate 86 is supported by pin 104 such that the clutch plate 86 is permitted to rotate relative to the housing 12. However, the clutch plate 86 is restricted from rotating relative to the housing 12 due to the interaction between the detents 116 of the clutch plate 86 and the balls 132 of the ball plungers 90. The balls 132 extend generally into the recess 46 of the cross-member 36 and engage detent 116 of the clutch plate 86 to prevent the clutch plate 86 from rotating as shown in FIGS. 4a–4c.

Figure 4A:
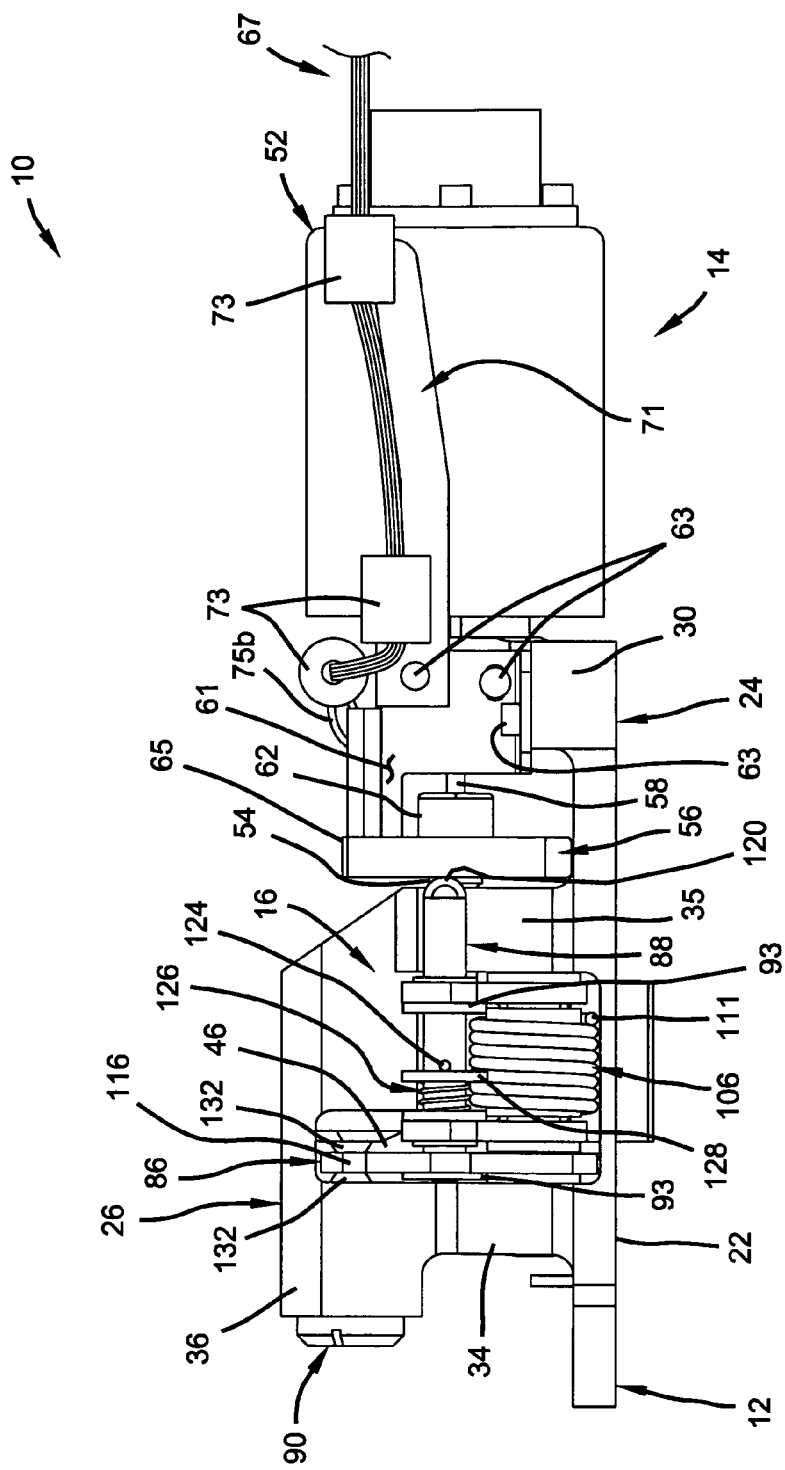
FIG. 4a is a side view of the strike assembly of FIG. 1 in a locked state.
Figure 4B:
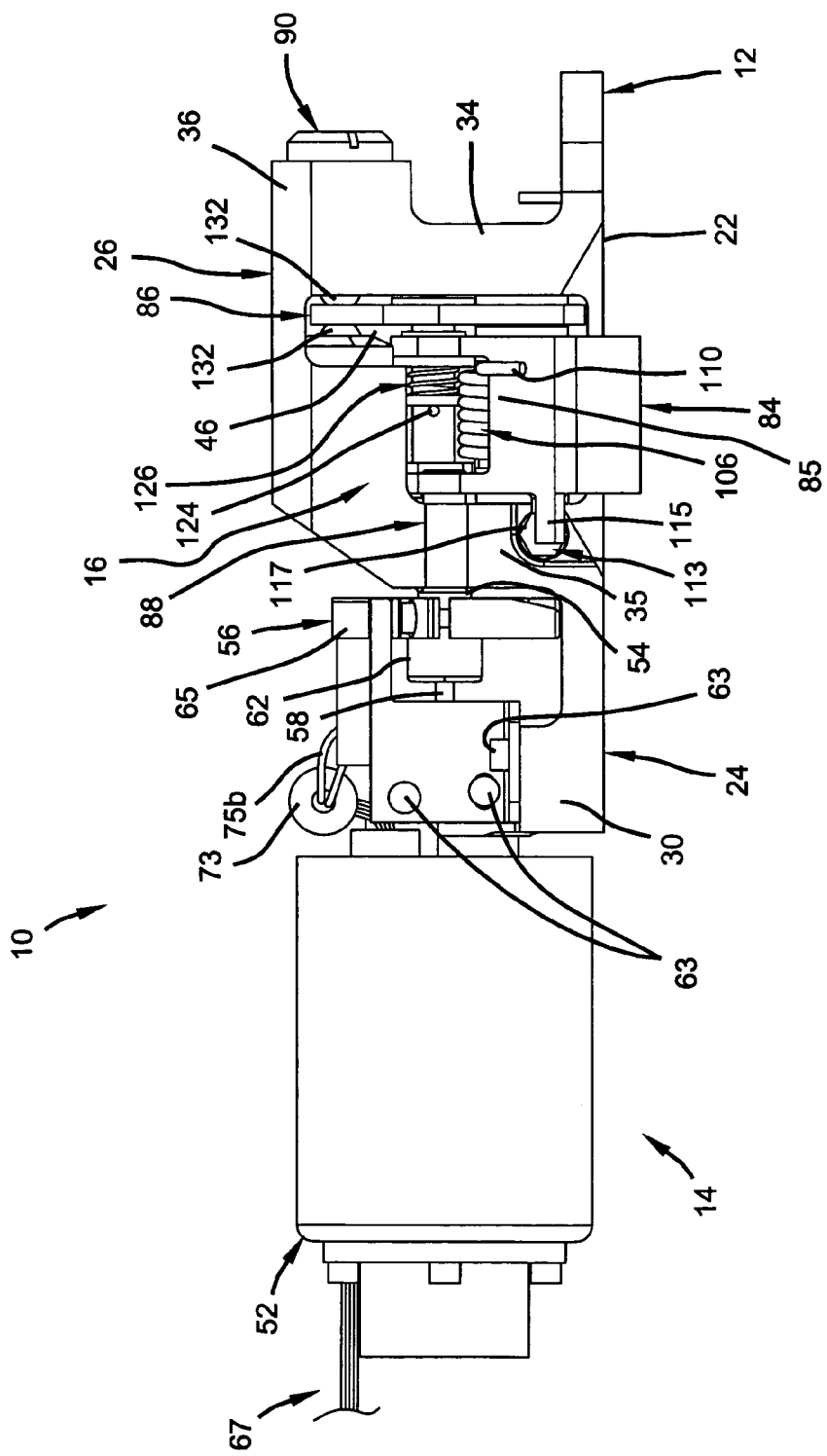
FIG. 4b is a side view of the strike assembly of FIG. 1 in a locked state.
Figure 4C:
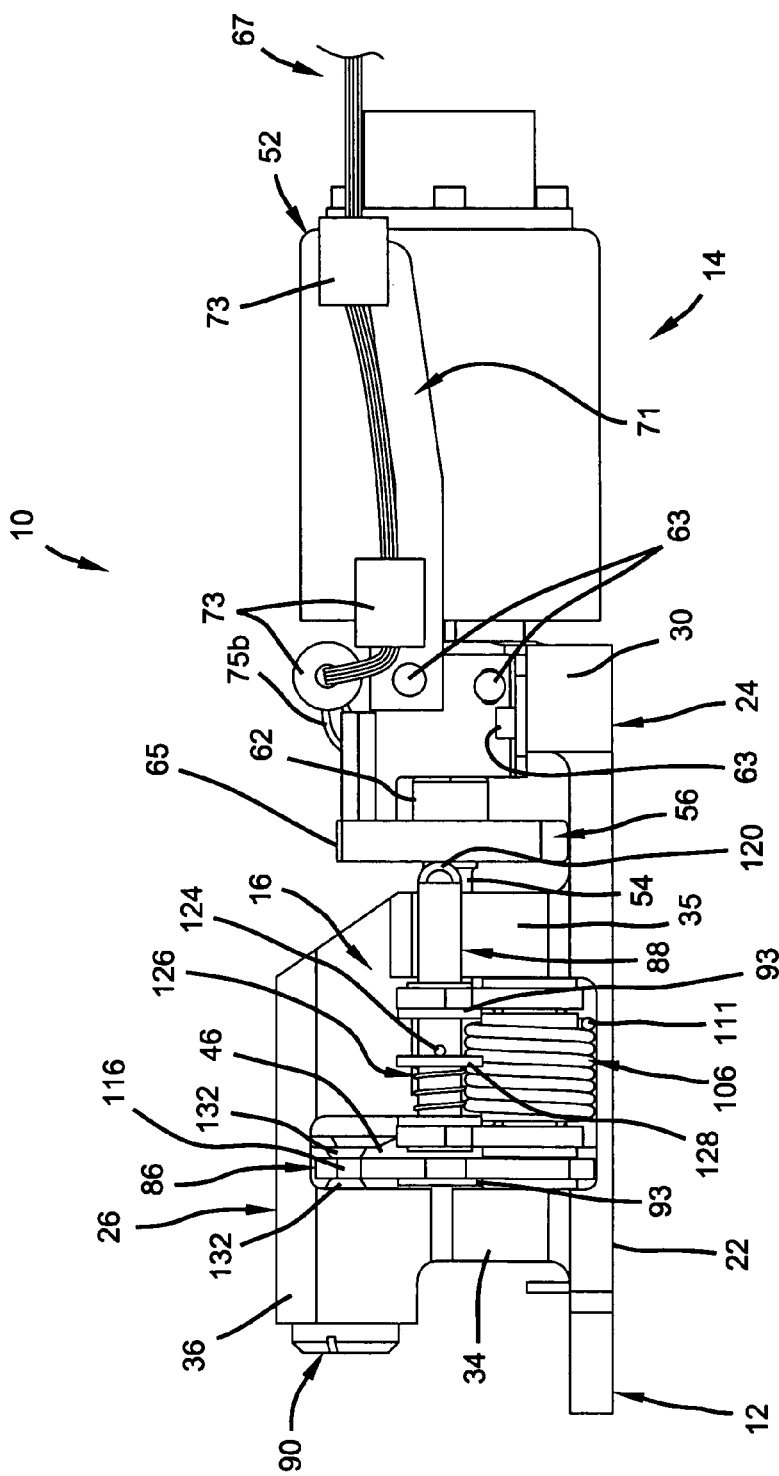
FIG. 4c is a side view of the strike assembly of FIG. 1 in an unlocked state.
Figure 6:
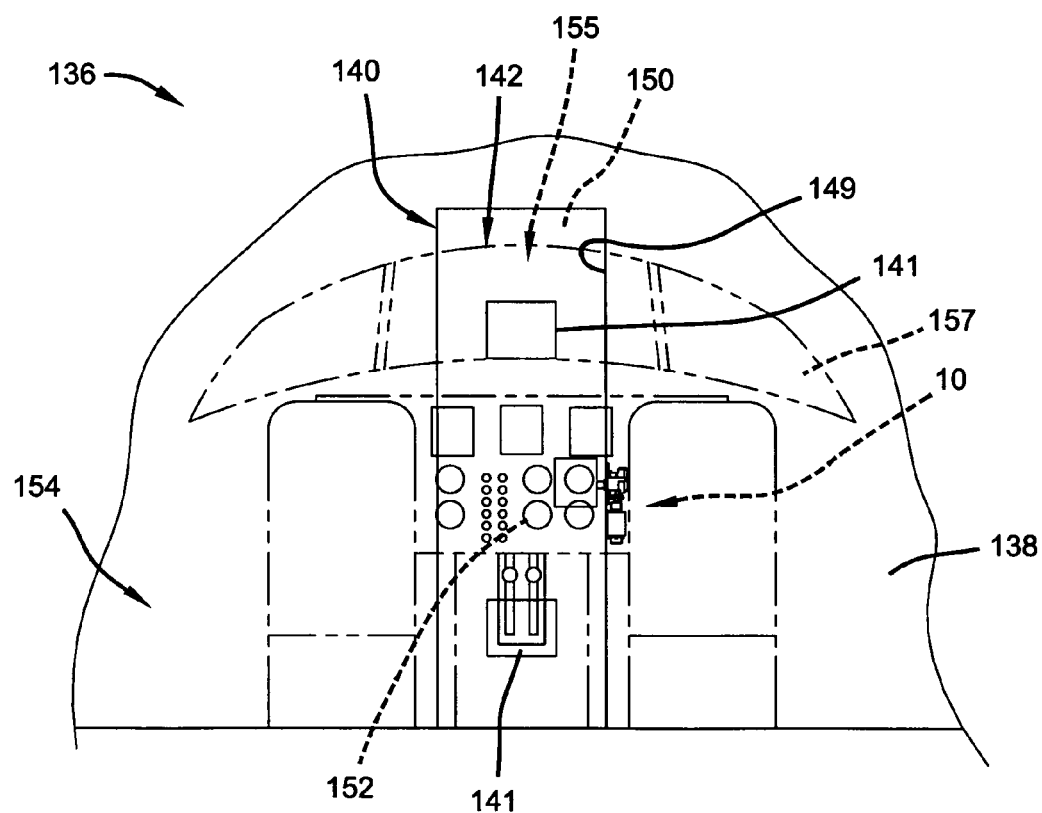
FIG. 6 is a perspective view of mobile platform incorporating a strike assembly in accordance with a preferred embodiment of the present invention with the strike assembly in a locked state.
Figure 7:
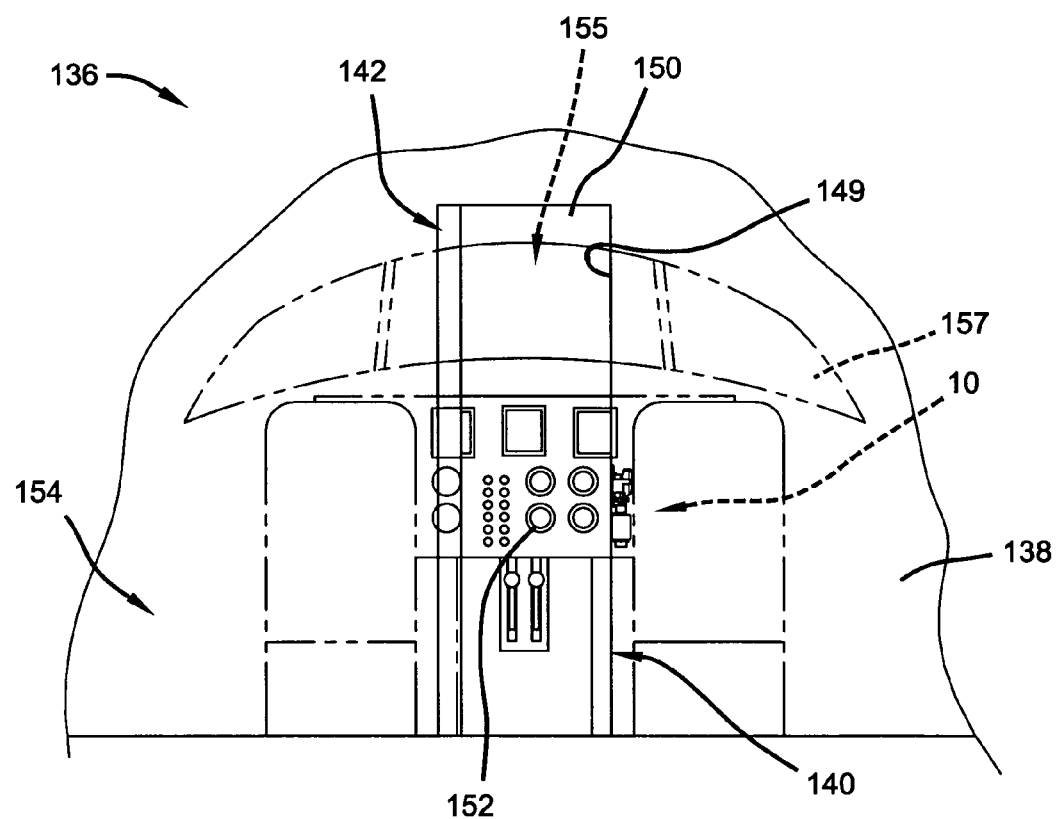
FIG. 7 is a perspective view of a mobile platform incorporating the strike assembly in an unlocked state.

With further reference to FIGS. 4a–4c, when the strike assembly 10 is in the locked state, the strike arm 84 is primarily restricted from rotating relative to the housing 12 due to the engagement between the lock pin 54 within notch 100. However, the relationship between the clutch plate 86, clutch pin 88, and ball plungers 90 contributes to restricting rotation of the strike arm 84 and plays a role in allowing the lock pin 54 to release from engagement with notch 100, as will be discussed further below.

The strike assembly 10 can be toggled into an unlocked state to allow the door 142 to rotate relative to the door frame 140 by de-energizing the solenoid 52 and causing the lock pin 54 to disengage notch 100. The solenoid 52 is de-energized by an operator (i.e., a pilot or conductor) depressing a switch (not shown) that is electrically coupled to the solenoid, to thereby de-energize the solenoid 52 and open the door 142. In an aircraft application, the solenoid 52 may be de-energized by a crew member, as previously discussed, but must also be automatically de-energized during a decompression event to allow venting of a cabin 154 of the mobile platform 136.

Referring to FIGS. 4a–4c, when the strike assembly 10 is actuated by a crew member, the solenoid 52 is de-energized and the output shaft 58 is toggled into the retracted position. In so doing, the lock pin 54, retainer plate 56, and hub 62 will move concurrently therewith. Once the output shaft 58 has sufficiently retracted, the lock pin 54 will be translated out of contact with the notch 100 such that the strike arm 84 is permitted to rotate relative to the housing 12.

The strike arm 84 is only permitted to rotate once the lock pin 54 fully disengages the notch 100 and the clutch pin 88 fully disengages lock aperture 114 of the clutch plate 86. The lock pin 54 disengages the notch 100 once the solenoid 52 has sufficiently retracted the output shaft 58. The clutch pin 88 fully disengages lock aperture 114 once the output shaft 58 has sufficiently retracted such that the retainer plate 56 no longer holds the clutch pin 88 against the bias of spring 126. Once the shaft 58 has sufficiently retracted, spring 126 acts on clutch pin 88 to move the clutch pin 88 out of engagement with the clutch plate 86, thereby permitting rotation of the strike arm 84.

Once the lock pin 54 is fully disengaged from notch 100 and the clutch pin 88 is fully disengaged from the clutch plate 86, the strike arm 84 is allowed to rotate in the clockwise direction relative to the view shown in FIG. 5b due to the bias imparted thereon by a crew member trying to enter a flight deck 155 from the cabin 154. Thus, to open the door 142 and enter the flight deck 155, a crew member applies a force on the door 142 once the strike has been disengaged such that the strike arm 84 rotates about pin 104 and the door 142 opens.

Once the door 142 is open, the strike arm 84 returns to perpendicularity with the door 142 and is ready to accept the latch bolt 144 due to the bias imparted thereon by coil spring 106. Coil spring 106 rotates the strike arm 84 until it is once again in a position to receive the latch bolt 144 (i.e., such that the strike arm 84 once again extends from surface 149 of the door frame 140).

Under a cabin decompression event, the door 142 experiences an extreme force that attempts to force the door 142 open. The two vent panels 141, disposed generally within the door 142, vent the flight deck 155 in the case of a cabin decompression. However, in the event of a flight deck decompression, the flight deck door 142 must open and vent the cabin/passenger area 154.

The decompression force associated with a flight deck decompression is generally transmitted from the door 142 to the strike assembly 10 through interaction betweeen the door latch 143, latch bolt 144, and strike arm 84. Such decompression forces cause the strike arm 84 to be placed under significant load while restraining the door 142 from rotating. However, under a flight deck decompression event, the door 142 must be quickly and automatically opened to vent the cabin area 154, as previously discussed. Therefore, a pressure sensor 152 is used to sense when a predetermined threshold pressure rate of change is occurring in the flight deck 155 that signifies a decompression condition.

When the predetermined pressure rate of change is sensed, the solenoid 52 is automatically de-energized and the lock pin 54 is retracted, thereby allowing the strike arm 84 to rotate and permit opening of the door 142. The open door 142 vents the cabin/passenger area 154 through the flight deck 155 and out a window 157 disposed within the flight deck 155.

The pressure sensor 152 detects the decompression event and initiates opening the door 142 by sending a logic signal to the aircraft controller to de-energize the solenoid 52. The solenoid 52 is required to exert a force on the lock pin 54 to remove the lock pin 54 from engagement with notch 100 to thereby permit rotation of the strike arm 84 and opening of the door 142. However, the solenoid 52 is not able to remove the lock pin 54 from engagement with the notch 100 if the door 142 and strike arm 84 are under a load caused by pressure (i.e., during a decompression event). Therefore, to permit the solenoid 52 to remove the lock pin 54 form the notch 100, all of the force that would be applied to the strike arm 84 under the decompression event must be stopped, diverted or delayed.

The engagement between the clutch plate 86 and clutch pin 88 temporarily absorbs the force being applied to the strike arm 84, thereby relieving the pressure exerted on the arm 84 and lock pin 54 and allowing the solenoid 52 to retract the pin 54 from the notch 100. The engagement of the clutch pin 88 with the strike arm 84 (via apertures 96) diverts the pressure force from the decompression event into the clutch plate 86. The pressure is diverted from the clutch plate 86 and into the housing 12 via detents 116 and ball plungers 90 to thereby allow the solenoid 52 to retract the lock pin 54.

The force exerted on the door 142 due to the pressure drop within the flight deck 155 is generally reciprocal to the force upon the door 142 exerted from the cabin side. A pre-set/pre-determined force generated by the balls 132 of ball plungers 90 is set such that critical loads to the mobile platform 136 are never reached. The force exerted by the ball plungers 90 force via engagement between the balls 132 and detents 116 stops and delays for a very short period of time (i.e., 5 milli-seconds, maximum), by diverting onto itself, the load caused by a pressure differential across the mobile platform 136. This load, for up to a time period of 5 milli-seconds, is not thrust upon the lock pin 54 when engaged with notch 100. Therefore, the solenoid 52 time has sufficient time to retract and withdraw the lock pin 54 from engagement with notch 100 of the strike arm 84.

When the solenoid 52 is initially de-energized, the clutch pin 88 is seated in aperture 114 of clutch plate 86 while the lock pin 54 is seated within notch 100, as previously discussed. In this manner, all of the force being applied to the strike arm 84 is transmitted to the ball plungers 90 via interaction between the clutch pin 88, clutch plate 86, and ball plungers 90. The strike arm 84 is prevented from being rotated by the decompression forces applied to the door 142 due to the interaction between the clutch pin 88, clutch plate 86, and ball plungers 90. In other words, all of the forces applied to the door 142 are absorbed by the clutch pin 88, clutch plate 86, and ball plungers 90 just long enough to allow the solenoid 52 to retract the lock pin 54 from the notch 100.

If the decompression force for a period of time (i.e., 5 milli-seconds) following initiation of the decompression event is not transmitted to the clutch pin 88, clutch plate 86, and ball plungers 90, all of the force being applied to the door 142 would be applied to the strike arm 84 and lock pin 54. Under such circumstances, the strike arm 84 would slightly rotate and bind the lock pin 54 within notch 100 and against attachment arm 92, thereby preventing removal of the lock pin 54 from the notch 100, as the force required to remove the lock pin 54 would be too great for the solenoid 52 to overcome.

The solenoid 52 is permitted to toggle the output shaft 58 and lock pin 54 into the retracted position, as the ball plungers 90 temporarily prevent the decompression force from being applied to the strike arm 84 and lock pin 54 for approximately 4–5 milliseconds, as previously discussed. Once the lock pin 54 is disengaged from the notch 100, the continuously rising forces exerted on the door 142 due to the decompression event, overcome the forces applied to the clutch plate 86 via the ball plungers 90 and allow the clutch plate 86 to rotate with the strike arm 84.

Once the clutch plate 86 is disengaged from the ball plungers 90, the clutch plate 86 is permitted to rotate relative to the housing 12. At this point, the clutch plate 86, clutch pin 88, and strike arm 84 are rotated together about pin 104 in the clockwise direction relative to the view shown in FIG. 5b, against the bias of spring 106. Sufficient rotation of the strike arm 84 in the clockwise direction causes the engagement surface 102 to disengage the door bolt 144, thereby permitting rotation of the door 142 relative to the door frame 140. It should be understood that while ball plungers 90 are disclosed, any suitable device for temporarily holding the clutch plate 86 for a period of 5 milliseconds following initiation of a decompression event such as a shear pin (i.e., a pin designed to shear under a predetermined load) is anticipated and should be considered as part of the present invention.

The strike assembly 10 therefore enables the door 142 to be manually locked by a crew member to prevent unwanted access to the flight deck 154, while concurrently providing for automatic actuation of the strike arm 84, and thus unlocking of the door, under a decompression event.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A door strike apparatus for enabling opening of a door in the event of a decompression condition experienced within a deck of a structure, the apparatus comprising:
   a housing adapted to be supported on a frame adjacent the door;
   a strike arm rotateably supported by said housing and movable between a locked state restricting rotation of the door and an unlocked state permitting rotation of the door;
   an actuation mechanism having a lock member movable between a locked state and an unlocked state, said lock member being retracted from said strike arm when said strike arm is in said unlocked state and engaged with said strike arm when said strike arm is in said locked state;
   a clutch plate rotatably supported by said housing and selectively fixed for rotation with said strike arm; and
   said actuation mechanism being responsive to the decompression condition and being operable to selectively toggle said lock member out of engagement with said strike arm to permit automatic unlocking of said strike arm and opening of the door under the decompression condition, and further being movable into engagement with said strike arm to permit selective locking of the door when the decompression condition is absent.

2. The door strike of claim 1, further comprising a sensor in communication with said actuation mechanism, said sensor operable to detect a predetermined condition within the deck and control said actuation mechanism based on said predetermined condition.

3. The door strike of claim 2, wherein said sensor comprises a pressure sensor.

4. The door strike of claim 1, further comprising a clutch pin operable to selectively engage said clutch plate to temporarily restrict said strike arm from rotating relative to said housing.

5. The door strike of claim 1, wherein said clutch plate includes a series of detents, said detents operable to engage said housing to temporarily fix said clutch plate to said housing.

6. The door strike of claim 5, wherein said housing operably supports a pair of biasing members, said biasing members matingly received by said detents to temporarily fix said clutch plate and said strike arm to said housing.

7. The door strike of claim 5, wherein said pair of biasing members comprise ball plungers.

8. The door strike of claim 1, further comprising a lock pin fixedly attached to said lock member of said actuation mechanism, said lock pin operable to selectively engage said strike arm.

9. The door strike of claim 1, wherein said actuation mechanism includes a solenoid.

10. A mobile platform comprising:
   a passenger cabin;
   a cockpit;
   a door assembly separating said cockpit from said passenger cabin, said door assembly comprising:
      a door;
      a door frame rotatably supporting said door; and
      a strike apparatus fixedly supported by said door frame, said strike apparatus selectively locking said door to said frame and enabling automatic opening of said door relative to said door frame in the event of a decompression condition experienced in the mobile platform, the apparatus including:
- a housing adapted to be supported on said door frame adjacent said door;
- a strike arm rotatably supported by said housing and movable between a locked state restricting rotation of said door and an unlocked state permitting rotation of said door;
- an actuation mechanism having a lock member movable between a locked state and an unlocked state, said lock member being retracted from said strike arm when said strike arm is in said unlocked state and engaged with said strike arm when said strike arm is in said locked state;
- a clutch plate rotatable supported by said housing and selectively fixed for rotation with said strike arm; and
- said actuation mechanism being responsive to the decompression condition and being operable to selectively toggle said lock member out of engagement with said strike arm to permit automatic unlocking of said strike arm and opening of said door under the decompression condition, and further being movable into engagement with said strike arm to permit selective locking of said door when the decompression condition is absent.

11. The mobile platform of claim 10, further comprising a sensor in communication with said actuation mechanism, said sensor operable to detect a predetermined condition within the deck and control said actuation mechanism based on said predetermined condition.

12. The mobile platform of claim 11, wherein said sensor comprises a pressure sensor.

13. The mobile platform of claim 11, wherein said sensor is disposed in said cockpit.

14. The mobile platform of claim 11, further comprising a controller in communication with said sensor.

15. The mobile platform of claim 10, further comprising a clutch pin operable to selectively engage said clutch plate to temporarily restrict said strike arm from rotating relative to said housing.

16. The mobile platform of claim 10, wherein said clutch plate includes a series of detents, said detents operable to engage said housing to temporarily fix said clutch plate and said strike arm to said housing.

17. The mobile platform of claim 16, wherein said housing operably supports a pair of biasing members, said biasing members matingly received by said detents to temporarily fix said clutch plate and said strike arm to said housing.

18. The mobile platform of claim 16, wherein said pair of biasing members comprise ball plungers.

19. The mobile platform of claim 10, wherein said door includes a door bolt, said strike arm receiving said door bolt in said locked state to prevent rotation of said door relative to said door frame.

20. The mobile platform of claim 10, further comprising a lock pin fixedly attached to said lock member of said actuation mechanism, said lock pin operable to selectively engage said strike arm.

21. The mobile platform of claim 10, wherein said actuation mechanism includes a solenoid.

* * * * *